United States Patent
Holst et al.

(10) Patent No.: US 6,553,284 B2
(45) Date of Patent: Apr. 22, 2003

(54) PROCESS TO PREVENT THE OVERTURNING OF A VEHICLE AROUND ITS LONGITUDINAL AXIS

(75) Inventors: Hans Holst, Velber (DE); Klaus Lindemann, Gehrden (DE); Ingo Tha, Hannover (DE)

(73) Assignee: WABCO GmbH & Co., OHG, Hannover (DE)

( * ) Notice: Subject to any disclaimer, the term of this patent is extended or adjusted under 35 U.S.C. 154(b) by 57 days.

(21) Appl. No.: 09/826,537

(22) Filed: Apr. 4, 2001

(65) Prior Publication Data

US 2001/0037677 A1 Nov. 8, 2001

(30) Foreign Application Priority Data

Apr. 5, 2000 (DE) .......................................... 100 17 045

(51) Int. Cl.[7] .............................................. G06F 17/00
(52) U.S. Cl. ......................................................... 701/1
(58) Field of Search ................................. 73/23.31, 754, 73/766, 720, 104, 121, 128, 129, 130; 701/1, 38, 45, 70–93

(56) References Cited

U.S. PATENT DOCUMENTS 6,349,247 B1 * 2/2002 Schramm et al. .............. 701/1

FOREIGN PATENT DOCUMENTS

| DE | 9602879 | 7/1987 |
| DE | 9802041 | 7/1999 |
| DE | 9907633 | 10/1999 |
| DE | 9936423 | 2/2000 |

* cited by examiner

*Primary Examiner*—Hezron Williams
*Assistant Examiner*—Monica D. Harrison
(74) *Attorney, Agent, or Firm*—Proskauer Rose LLP (57) ABSTRACT

A process to prevent a vehicle, such as a tractor-trailer, from overturning while negotiating a curve recognizes the potential for overturning, and automatically activates a preventive braking process. In addition, the automatic braking process is terminated in a timely fashion to avoid overbraking the vehicle. This is accomplished by subjecting at least one wheel on the inside of the curve to a relatively weak braking force during the automatic braking process, and by adjusting the braking parameters in accordance with the vehicle's response characteristics.

9 Claims, 5 Drawing Sheets

PROCESS TO PREVENT THE OVERTURNING OF A VEHICLE AROUND ITS LONGITUDINAL AXIS

BACKGROUND OF THE INVENTION

The present invention relates to the control of a vehicle. More specifically, the present invention relates to a process for preventing a vehicle from overturning around its longitudinal axis.

A process of this type is known from the German patent DE 196 02 879 C1, which is incorporated herein by reference.

This prior art process relates to recognizing the likelihood of a vehicle overturning, and in particular, a vehicle consisting of a tractor and a trailer. The danger of overturning is recognized through a minimal actuation of the trailer brakes, combined with the observation of the reaction of an ABS anti-lock braking system incorporated in the trailer. If the ABS starts regulating and carries out a locking prevention action in conjunction with this relatively weak braking, there is an imminent danger of the tractor-trailer overturning. Upon this situation occuring, either a warning signal is emitted, or a stronger brake intervention is carried out in order to reduce the transverse acceleration of the tractor-trailer.

In addition to recognizing the right time to start such a stabilizing braking intervention, it is also important to recognize the right time to terminate the braking intervention. That is, at the time when the danger of overturning is no longer acute, the braking intervention should be reduced to avoid braking the vehicle unnecessarily.

It is therefore an object of the present invention to disclose a simple and reliable process for preventing a vehicle from overturning around its longitudinal axis, in which a stabilizing braking intervention is terminated in a timely manner.

SUMMARY OF THE INVENTION

A process to prevent the overturning of a vehicle around its longitudinal axis, as e.g., when rounding a curve, automatically evaluates the potential danger of overturning, and then proceeds to apply braking as required, in the following manner:

a) applying a first braking force to at least one of the vehicle wheels on the outside of the curve, to prevent the vehicle from overturning;

b) applying a second braking force to at least one of the vehicle wheels on the inside of the curve, where the second braking force is weaker than the first braking force;

c) terminating the first and second braking forces when a rotational speed of a wheel on the inside of the curve accelerates in a predetermined characteristic manner.

The inventive process determines the potential danger of overturning by determining the transverse acceleration level of the vehicle, based on the rotational speeds of the wheels, and comparing this transverse acceleration level to a predetermined threshold level. When the transverse acceleration level of the vehicle exceeds the predetermined threshold level, a potential danger of overturning is indicated.

The process further evaluates the danger of overturning by checking a wheel on the inside of the curve to sense a characteristic reduction of the wheel's rotational speed as a result of the second braking force. At the same time, the process ascertains whether a rotational speed of a wheel on the outside of the curve remains essentially unchanged.

Where applicable, the process also disables the anti-lock braking system slippage signals for a wheel on the inside of the curve when the second braking force is applied.

One advantage of the present invention is that the time when there is no longer a danger of overturning can be ascertained indirectly from the wheel load; i.e., by evaluating the behavior of the wheel with the lesser applied braking force. Using this technique, no further information need be obtained, such as the level of the center of gravity, or the actual transverse acceleration, which can only be ascertained by a sensor. Therefore, no additional sensors are needed, and the inventive process can be implemented very economically through a simple expansion of the control program of an electronic control device.

In the prior art processes to prevent overturning, in which the wheels on both sides of the vehicle are subjected to approximately the same, relatively high braking force, the wheels on the inside of a curve don't show that slippage has decreased until the wheel load is relatively great. This results in a calculated value of transverse acceleration that is relatively high, which in turn results in a continuation of the high braking force. Such a relatively later termination of the ABS-regulation process is regarded as uncomfortable. If the vehicle is braked in this manner so that it almost comes to a stop, the further consequence may be endangering the surrounding traffic. In the present invention, however, a considerably lower braking force is applied to the wheels on the inside of the curve, which results in an earlier start-up of those wheels, and thereby to a lower calculated transverse acceleration level, which enables the braking intervention to be terminated earlier and more safely.

The present invention is applicable to conventional compressed-air-controlled braking systems for utility vehicles, as well as to braking systems using any other type of actuating energy, such as hydraulic compression or electrical servomotors.

Another advantage of the present invention is that the braking intervention to prevent overturning is terminated when the rotational speed of at least one wheel on the inside of the curve accelerates in a characteristic manner. This eliminates the need for a separate load sensor to recognize the load increase on the wheel on the inside of the curve. Instead, the rotational-speed sensor already included in an anti-locking system can also be used for this purpose. It is a further advantage of the present invention that the calculation for transverse acceleration requires no special programming to recognize that there is no longer a danger of overturning. Instead, the increasing rotational speed of the wheel on the inside of the curve is included in this calculation, which then shows a decrease of the transverse acceleration level as shall be explained in further detail below.

In the present invention, test braking with a relatively lower braking force is applied to at least one wheel on the inside of the curve, in order to recognize a potential danger of overturning. Also, the ABS slippage signals of at least one wheel subjected to the test braking are disabled. As a result, the wheel subjected to test braking is not influenced by the ABS. It is therefore not possible that the brake of the wheel subjected to the test braking is bled by the ABS due to excessive wheel slip, and it is not able to start up again. In contrast to a complete elimination of the ABS function, this suppression of the ABS slippage signals enables the anti-locking function to be maintained on the basis of acceleration signals, for as long as the wheel has contact with the ground. This helps to prevent damage to the tires, such as flat spots, for example.

BRIEF DESCRIPTION OF THE DRAWINGS

The invention is described in greater detail below through the example of an embodiment shown in the drawings, wherein.

DETAILED DESCRIPTION OF PREFERRED EMBODIMENTS OF THE INVENTION

Figure 1:
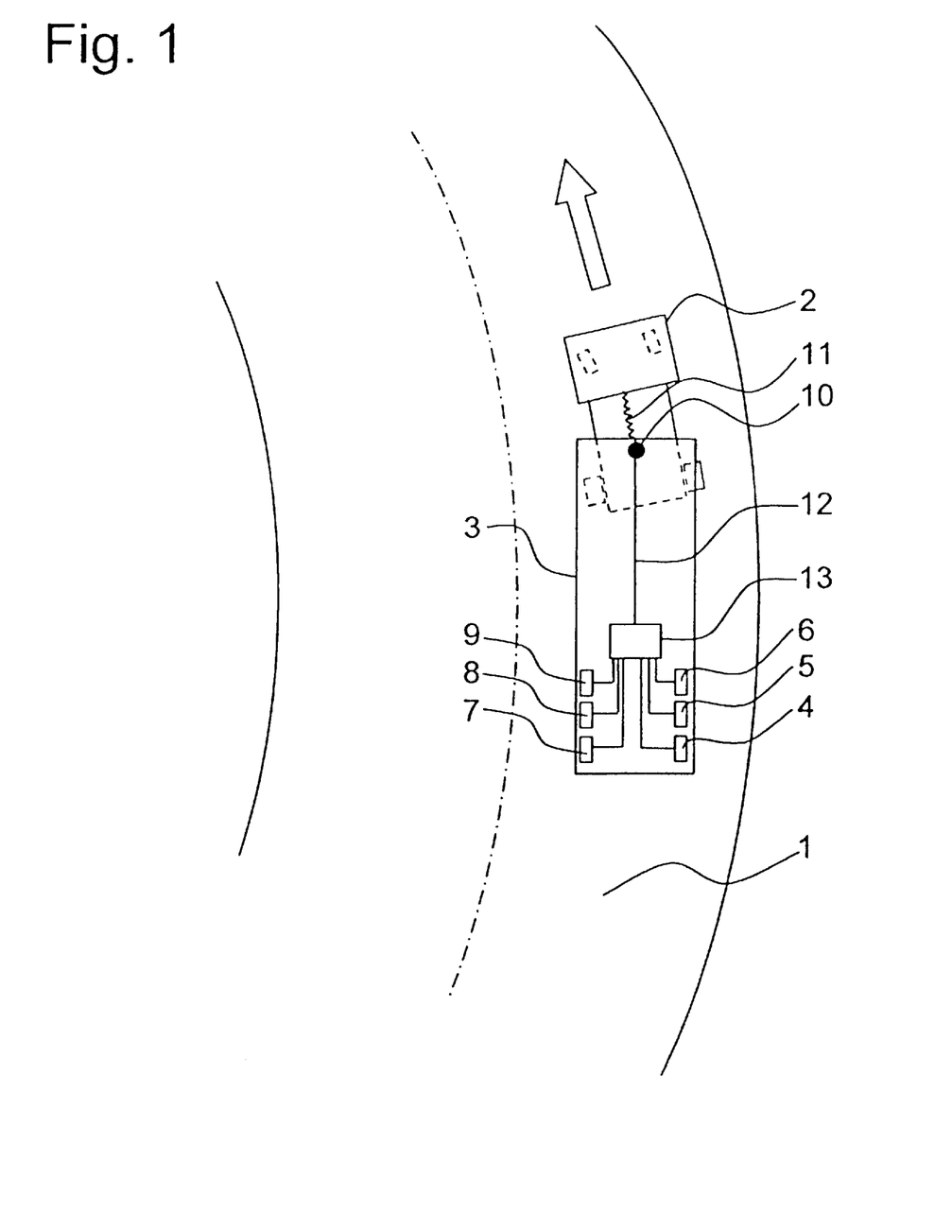
FIG. 1 shows a vehicle in a left curve, as seen from above.

FIG. 1 shows a vehicle, consisting of a tractor vehicle 2 and a semi-trailer 3, traveling in a left curve on a road 1 as seen from above. While the present invention is applicable to this type of tractor-trailer configuration, it is not limited to vehicles of this type. The trailer 3 has a pneumatic braking system that receives braking pressure from the tractor vehicle 2 in response to a brake pedal actuation by the driver. The braking system can also receive braking pressure by certain control and regulating functions of the tractor vehicle 2. To supply these functions, the tractor vehicle 2 is connected to the semi-trailer 3 via electrical and pneumatic lines 11.

The tractor vehicle 2 and the semi-trailer 3 are rotatably connected to each other at a pivot point 10.

The braking system of the semi-trailer 3 is preferably provided with electrically actuated components, such as anti-lock braking system (ABS) braking pressure modulators, or with purely electrically powered brake actuators. The brake modulators, or brake actuators, are controlled by an electronic control system 13. The control system 13 and the brake modulators/brake actuators are supplied with electrical energy and with the braking energy pressure medium via electrical and pneumatic lines 12. In addition, the rotational speed signals of the wheels 4, 5, 7, 8 (designated as $v_4$, $v_5$, $v_7$, $v_8$) are inputted to the electronic control system 13, as is known in the art of anti-lock braking systems.

In the illustrated embodiment, the semi trailer wheels 4, 5, 6 are on the outside of the curve, and the wheels 7, 8, 9 are on the inside of the curve.

The electronic control system 13 executes a number of control and regulating tasks in the semi-trailer 3. Importantly, one of these tasks is to recognize a likely possibility of the vehicle 2, 3 overturning around its longitudinal axis, and to prevent such an overturning action by means of a controlled braking intervention. This preventive action is illustrated by an example flow chart in FIG. 2.

Figure 2:
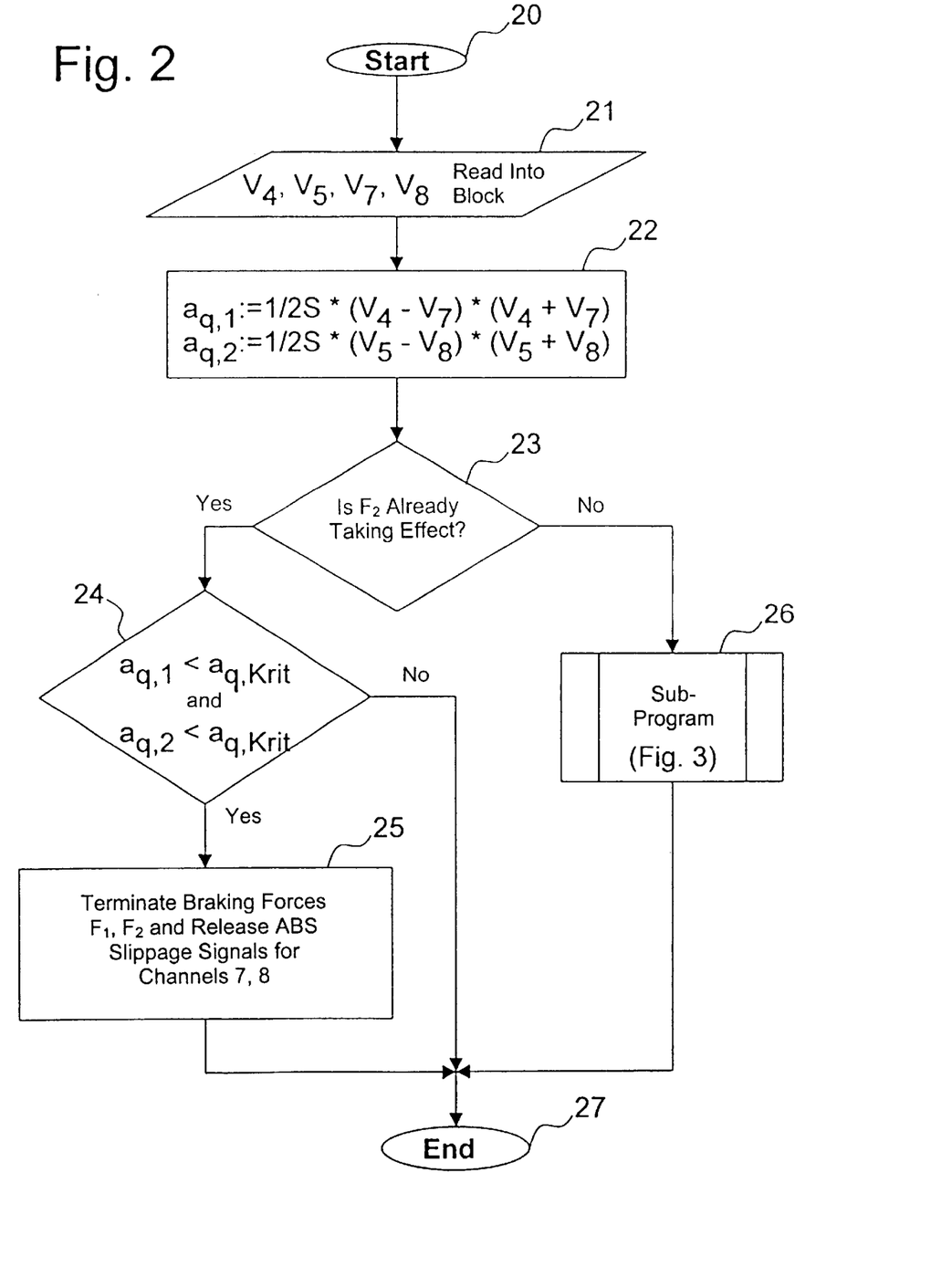
FIGS. 2, 3 and 4 show a preferred embodiment of the invention in flow-chart format.

The process starts at step 20. At step 21, the rotational speeds $v_4$, $v_5$, $v_7$, $v_8$ of the wheels 4, 5, 7, 8 are read in. In step 22, a first transverse acceleration signal $a_{q,1}$ is calculated from the rotational speeds $v_4$, $v_7$, and a second transverse acceleration signal $a_{q,2}$ is calculated from the rotational speeds $v_5$, $v_8$ in accordance with the following formulas:

$$a_{q,1} = \tfrac{1}{2} S \times (v_4 - v_7) \times (v_4 + v_7) \quad [1]$$

$$a_{q,2} = \tfrac{1}{2} S \times (v_5 - v_8) \times (v_5 + v_8) \quad [2]$$

The value S represents the wheel gauge of the vehicle. The transverse acceleration signals $a_{q,1}$, $a_{q,2}$ are used jointly in this illustrative embodiment in order to make the process less prone to malfunctions, such as signal discrepancies, different tire diameters, etc. In this manner, erroneous triggering of the inventive process can be avoided.

In step 23, it is determined whether or not a braking force $F_2$ had already been applied during a previous programmed execution of the process to avoid overturning. If so, the inventive process bypasses the sub-program block 26, to be described in detail in conjunction with FIGS. 3 and 4, and branches off directly to step 24, where it is determined if there is still a danger of overturning.

Figure 3:
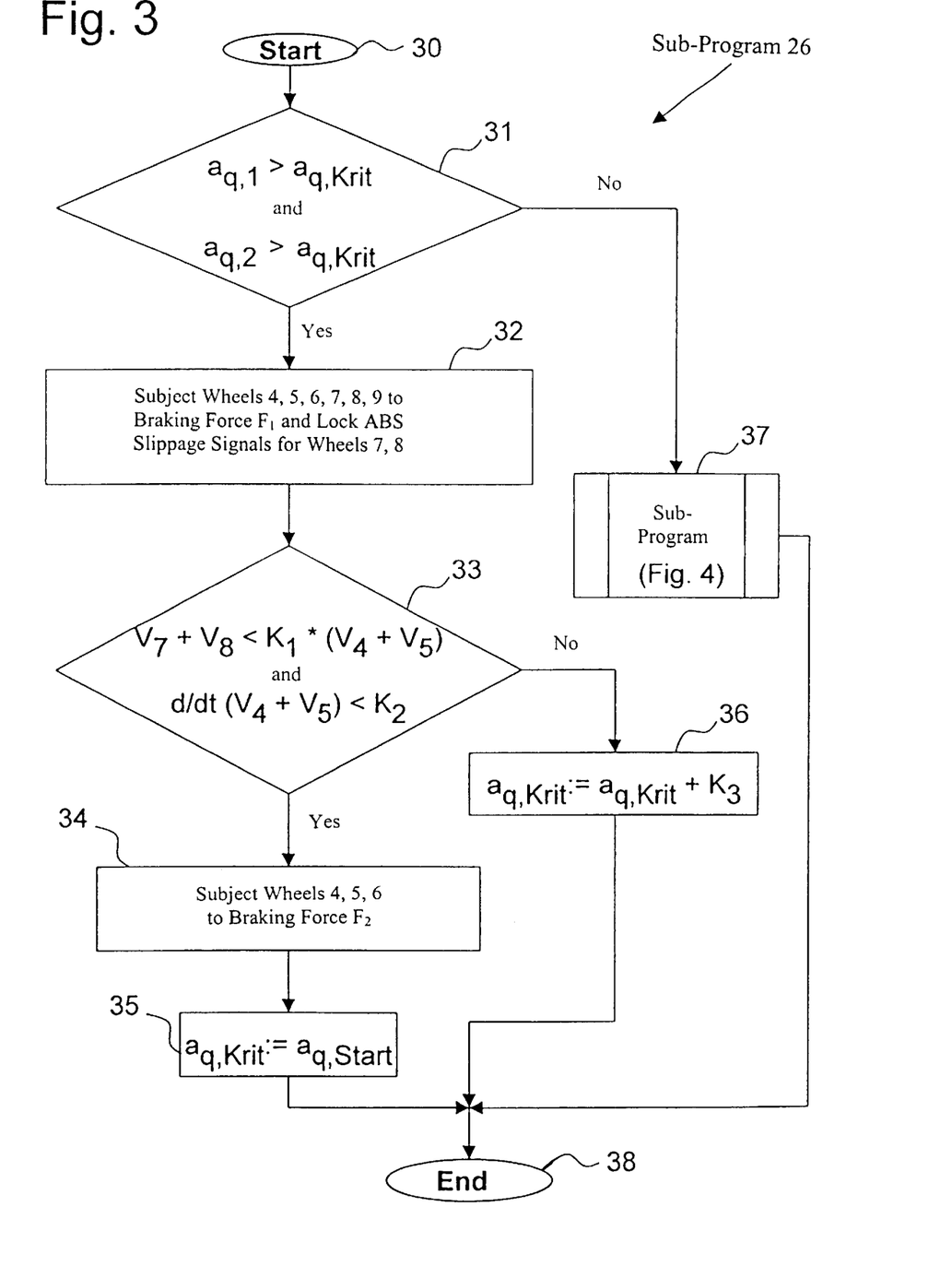

Referring again to step 23, if $F_2$ has not already been applied, the process continues with the sub-program block 26, which is described in FIG. 3. This sub-program begins with a step 30. In step 31, the process determines whether the first transverse acceleration signal $a_{q,1}$, and the second transverse acceleration signal $a_{q,2}$, exceed a predetermined transverse acceleration threshold $a_{q,krit}$. If so, the wheels 4, 5, 6, 7, 8, 9 of the semi-trailer 3 are subjected to a relatively low braking force $F_1$, as indicated in step 32. The braking force $F_1$ is set so that only a relatively slight braking effect occurs, which is barely perceptible to the driver. Also, braking force $F_1$ is set so that no locking of wheels occurs, even on road surfaces with a relatively low frictional value, if there is no danger of overturning at this point. In a typical compressed-air braking system, a braking force of approximately 1 to 2 bar is applied in order to deliver the braking force $F_1$.

Also in step 32, the ABS slippage signals for the wheels 7, 8 are disabled, in order to avoid activation of the anti-locking function due to high slippage. However, activation of the anti-locking function based on acceleration signals continues to be enabled, so that possible damage to the tires can be avoided.

In step 33, at the end of a sufficiently long build-up time for the braking force $F_1$, two evaluations are made. First, it is ascertained whether the rotational speeds $v_7$, $v_8$ of the wheels 7, 8 on the inside of the curve are characteristically lower than the rotational speeds $v_4$, $v_5$ of the wheels 4, 5 on the outside of the curve. This is done by comparing the sum of the rotational speeds $v_7$, $v_8$ with the sum of the rotational speeds $v_4$, $v_5$ times a factor $K_1$. Then, the rotational speeds $v_4$, $v_5$ are checked to see that they remain essentially unchanged. This is accomplished by checking the sum of the retardations of the wheels 4, 5; i.e., of the first time derivation of the appertaining rotational speeds $v_4$, $v_5$. Checking the wheels 4, 5 on the outside of the curve for continued relatively high rotational speeds serves to avoid triggering the inventive process by mistake, in the case of relatively low frictional values; e.g., on an icy surface. In that type of situation, it can happen that not only the rotational speeds of the inner wheels (7, 8), are reduced intentionally by the banking force $F_1$ which is applied in the form of test braking, but also the rotational speeds $v_4$, $v_5$ of the outer wheels are reduced intentionally by the braking force $F_1$, which is applied in the form of test braking. In this case, the speed reduction of the inner wheels 7, 8 does not presage an imminent overturning of the vehicle 2, 3.

If both conditions of step 33 are met, it is assumed that there is an imminent danger of overturning. At this point (step 34), the wheels 4, 5, 6 on the outside of the curve, which have the better frictional contact between road surface and tire, are subjected to a braking force $F_2$, that is greater than the braking force $F_1$. The level of braking force $F_2$ is selected to immediately reduce the vehicle speed, so that the transverse acceleration, and thereby the danger of overturning, is also reduced immediately. The physical relationship between the vehicle's transverse acceleration $a_q$ and the vehicle speed v is determined according to the following equation, where the value R indicates the curve radius:

$$a_q = v^2/R \quad [3]$$

The anti-locking system prevents the wheels to which the braking force $F_2$ is applied from locking up. The weaker braking force $F_1$ continues to be applied to the wheels 7, 8, 9 on the inside of the curve. In order to produce the braking force $F_2$, a pressure of 4 to 8 bar is preferably applied in a conventional compressed air braking system.

In step 35, the transverse acceleration threshold $a_{q,krit}$, which is used to recognize a danger of overturning and to trigger the test braking, is set to a starting value $a_{q,start}$. This will be described in further detail below, in an embodiment of the invention wherein the transverse acceleration threshold $a_{q,krit}$ can be varied.

The sub-program 26 then ends with a step 38.

Referring back to FIG. 2, if the decision in step 23 is yes, the process continues at step 24. Here, a determination is made as to whether or not the first transverse acceleration signal $a_{q,1}$ and the second transverse acceleration signal $a_{q,2}$ fall below the transverse acceleration threshold $a_{q,krit}$. If they do fall below, there is no longer any danger of overturning, and the braking forces $F_1$, $F_2$ can be terminated in step 25. In addition, the ABS slipping signals, which were disabled in step 32 of FIG. 3, can be released. If the first and second transverse acceleration signals $a_{q,1}$ and $a_{q,2}$ do not fall below the transverse acceleration threshold $a_{q,krit}$ (step 24, FIG. 2), the process bypasses block 25, and branches directly to step 27, where the process ends.

The above described inventive process, and especially the utilization of the transverse acceleration signals $a_{q,1}$, $a_{q,2}$, can be summarized as follows. When a danger of overturning threatens, the wheels 7, 8, 9, having a lighter load on the inside of the curve, tend towards a decreased rotational speed due to the test braking force $F_1$. This causes a relatively large difference in rotational speed between the wheels on the inside and those on the outside of the curve. By applying the equations [1] and [2], this difference results in a rapid increase of the first and second transverse acceleration signals $a_{q,1}$, $a_{q,2}$. On the other hand, the return of the wheels 7, 8, 9 to the road surface; e.g., as a result of the larger braking force $F_2$ in step 34 of FIG. 3, causes the calculated transverse acceleration signals $a_{q,1}$, $a_{q,2}$ to decrease rapidly. Due to this rapid change in the transverse acceleration signal levels, the test braking force $F_1$, which stops the wheels bearing the lesser load when there is a danger of overturning, can be used to recognize the return of the wheels to the road surface, indicating the end of the danger of overturning. Under these conditions, the wheels on the inside of the curve start up again due to the increasing wheel load, in spite of the effect of braking force $F_1$, resulting in a characteristic increase in rotational speeds $v_7$, $v_8$.

Referring again to FIG. 3, if one or both conditions checked in step 33 are not met, the transverse acceleration threshold $a_{q,krit}$ is increased by a value $K_3$ (step 36), and the process branches off to step 38, where it ends. Steps 36, 35, and sub-program step 37 are part of an embodiment of the invention to be explained in further detail below.

Figure 4:
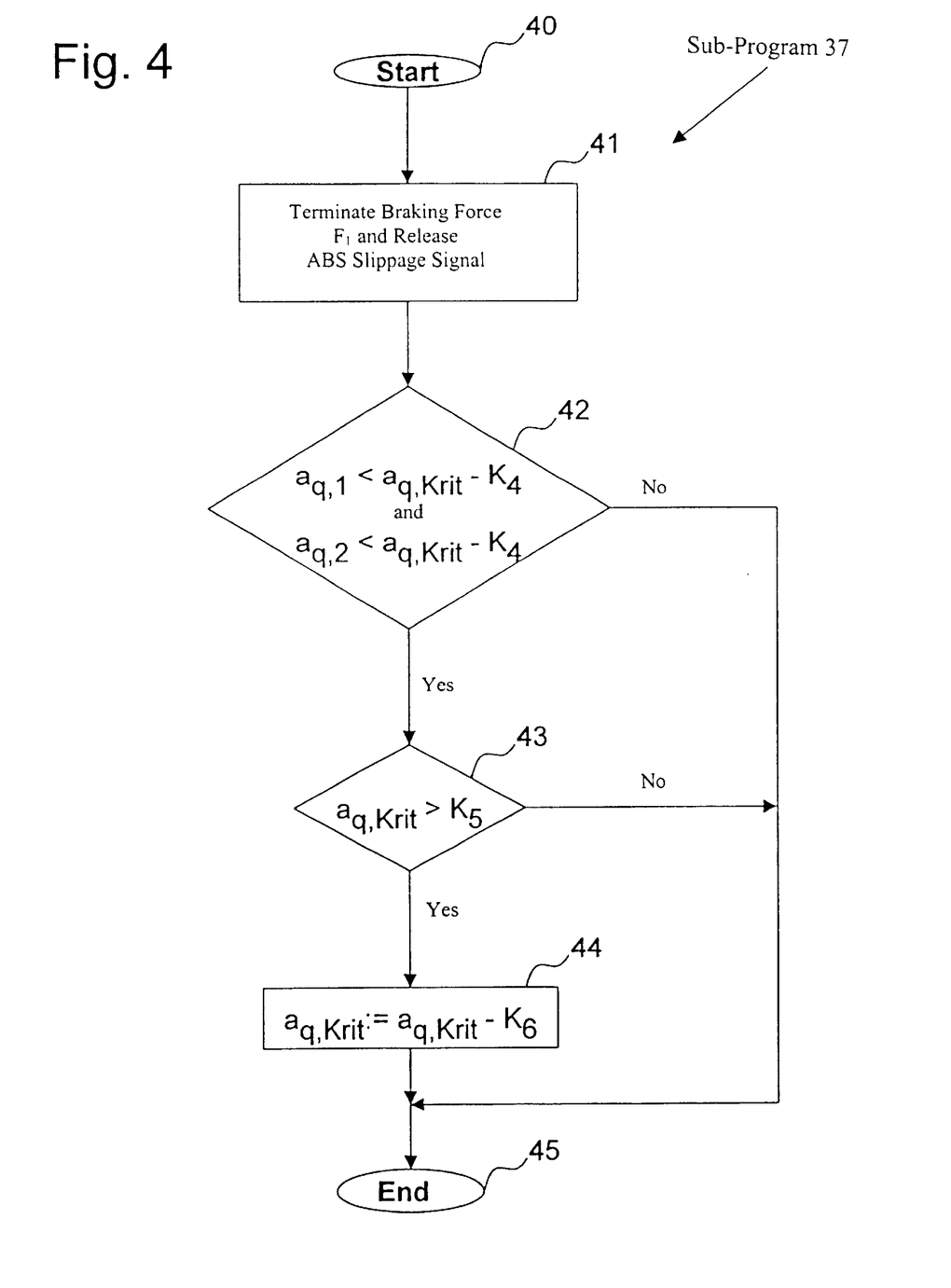

If one or both conditions checked in step 31 are not met, the process branches off to the sub-program block 37, which is shown in further detail in FIG. 4.

The sub-program 37 starts at step 40. In step 41, the test braking force $F_1$ is terminated. Also, the ABS slippage signals that had been disabled in step 32 are released. The process then continues with step 42, where the condition previously checked in step 24 (FIG. 2) is evaluated. This evaluation determines whether the termination of the brake intervention has fallen short by a given value $K_4$. That is, it is ascertained whether every transverse acceleration signal $a_{q,1}$, $a_{q,2}$ falls short of the transverse acceleration threshold $a_{q,krit}$ by a value $K_4$. If this is true, then the vehicle 2, 3 is relatively safe from the danger of overturning, and the transverse acceleration threshold $a_{q,krit}$, which was raised by a value K3 in step 36 (FIG. 3), can be lowered with little risk of erroneously triggering the process to prevent overturning. However, the lowered level of the transverse acceleration threshold $a_{q,krit}$ must not fall below a certain minimum value $K_5$, which is predetermined as a function of the vehicle characteristics.

This condition is checked in step 43. If it has been met, the transverse acceleration threshold $a_{q,krit}$ is decreased in step 44 by a value $K_6$, and the process ends at step 45. However, in the event of a negative result of the check in step 42 or 43, the process moves directly to step 45.

A starting value $a_{q,start}$ of the transverse acceleration threshold $a_{q,krit}$ can be predetermined and stored as a parameter in a non-volatile memory, based on the characteristics of the vehicle. In an advantageous embodiment of the present invention, this starting value may be determined in dependance of the vehicle loading; e.g., by measuring the pressure in the air suspension bellows when the vehicle is so equipped.

Figures 5, 5A:
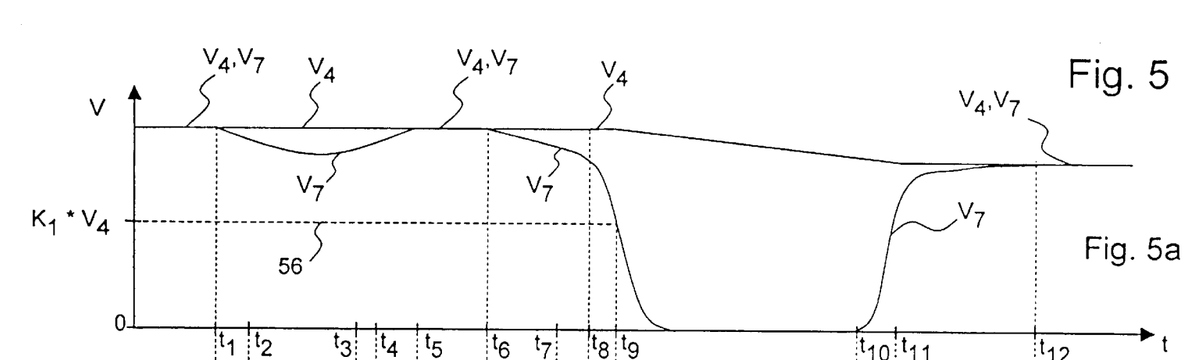
FIG. 5 shows the embodiment of FIGS. 2, 3, and 4 in the form of a timing diagram.

Two typical applications of the inventive process are illustrated in the timing diagrams of FIG. 5. One application depicts a vehicle traveling on a curve with no danger of overturning, and the other application depicts a vehicle traveling on a curve with imminent danger of overturning. The above described signal magnitudes are represented as velocity values in FIG. 5a, as transverse acceleration values in FIG. 5b, and as braking forces F (or braking pressures p) for both left and right sides of the vehicle in FIG. 5c. All the figures (5a, 5b, and 5c) have a common x-axis time base. In order to simplify the representation, only the rotational speed signals $v_4$, $v_7$ (of the wheels 4, 7) of the semi trailer 3 are considered, in addition to the signals $a_{q,1}$, $a_{q,krit}$ derived from them. The inventive process can also apply to vehicles with only one axle, or with only one axle equipped with rotational speed sensors.

Starting at time $t_0$, the vehicle 2, 3 travels in a straight line at a normal speed. At this time, the rotational speeds $v_4$, $v_7$ have identical values, and the transverse acceleration signal $a_{q,1}$ has a value=0. At time $t_1$, the vehicle 2, 3 begins to travel into a left curve as shown in FIG. 1. At the same time, the rotational speed $v_7$ (on the inside of the curve) decreases relative to the rotational speed $v_4$ (on the outside of the curve), where a relatively small decrease in rotational speed $v_4$ is caused by the semi-trailer 3. This small decrease in rotational speed $v_4$ is considered negligible, however, and is disregarded in FIG. 5a.

Figures 5B, 5C:
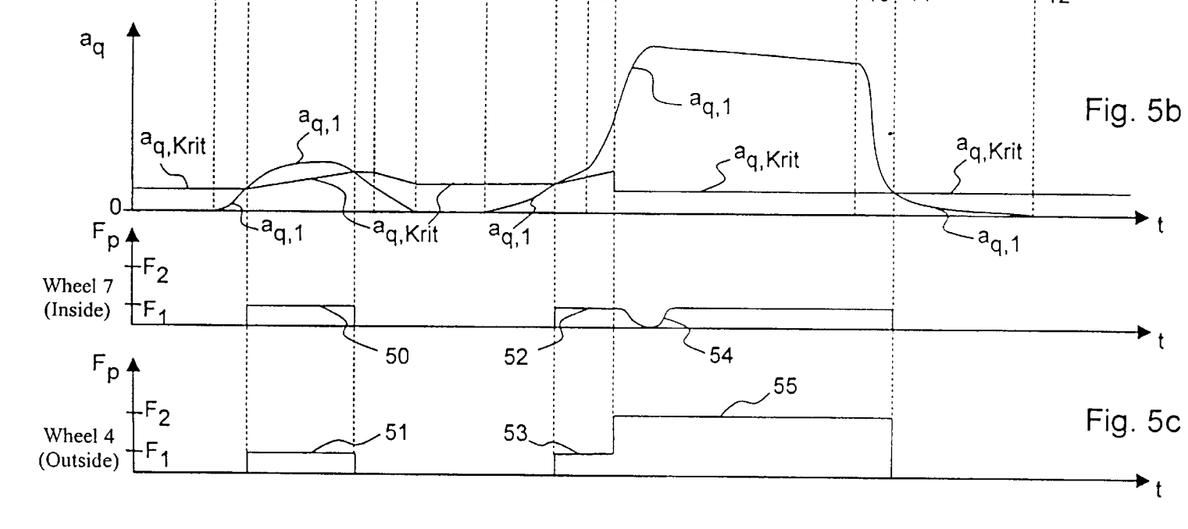

Due to the difference between the rotational speeds $v_4$ and $v_7$, the transverse acceleration signal $a_{q,1}$ increases (Equation 1), and at time $t_2$, reaches the transverse acceleration threshold $a_{q,krit}$. As a result, the test braking action is triggered at all the wheels (4, 5, 6, 7, 8, 9) of the semi-trailer 3 in FIG. 1. This is illustrated in FIG. 5c by an increase in braking force to the value $F_1$ (signals 50, 51). Furthermore, the transverse acceleration threshold $a_{q,krit}$ is increased, in accordance with every embodiment of the inventive process depicted in FIGS. 2 to 4. Illustratively, this increase can be made in fine-tuned steps ($K_3$ in step 36 of FIG. 3) over intervals of 10 ms, as indicated by the ramp-shaped rise in FIG. 5b. At time $t_3$, the transverse acceleration signal $a_{q,1}$ falls below the transverse acceleration threshold $a_{q,krit}$, and this results in a termination of the test braking action (FIG. 5c). The transverse acceleration threshold $a_{q,krit}$, which had been increased between times $t_2$ and $t_3$, is initially maintained, since no serious danger of overturning was recognized in this time period. As such, the higher transverse acceleration threshold $a_{q,krit}$ is compatible with safety, since it can be assumed that the critical value of transverse acceleration is higher when there is a danger of overturning than the transverse acceleration threshold $a_{q,start}$, which was assumed at the start of vehicle travel.

At time $t_4$, the condition in step 42 (FIG. 4) is met; i.e., the transverse acceleration signal $a_{q,1}$ (FIG. 5b) falls below the transverse acceleration threshold $a_{q,krit}$ by a value $K_4$. Therefore, the transverse acceleration threshold $a_{q,krit}$ is decremented in fine-tuned steps ($K_6$ in step 44, FIG. 4) for as long as the transverse acceleration threshold $a_{q,krit}$ is larger than the minimum value $K_5$ (step 43 in FIG. 4). This is illustrated in FIG. 5b by the ramp-shaped waveform between times $t_4$ and $t_5$. At time $t_5$, the transverse acceleration threshold $a_{q,krit}$ has reached the minimum value $K_5$, so that the condition verified in step 43 is no longer met, and the transverse acceleration threshold $a_{q,krit}$ remains at the minimum value $K_5$. In this manner, the transverse acceleration threshold $a_{q,krit}$ is adjusted as a self-learning function, in order to match the actual conditions of travel, in accordance with the embodiments of the process shown in steps 35, 36, and 42, 43, 44 of FIGS. 3 and 4, respectively.

Referring again to FIG. 5, the vehicle 2, 3 has ended its curve travel (time $t_5$), which leads to an adjustment of the rotational speeds $v_4$, $v_7$ to match each other, and to a return of the transverse acceleration signal $a_{q,1}$ to a value=0. At time $t_6$, the vehicle 2, 3 again travels into a left curve, but this time with a danger of overturning, so that the inventive process of recognizing and preventing such a mishap can be explained. Starting at time $t_6$, the rotational speed $v_7$ (on the inside of the curve) decreases, while the rotational speed $v_4$ (on the outside of the curve) remains essentially constant for the reasons previously discussed. At time $t_7$, the transverse acceleration signal $a_{q,1}$ exceeds the transverse acceleration threshold $a_{q,krit}$, causing the test braking action to be initiated (signals 52, 53 in FIG. 5c), and the transverse acceleration threshold $a_{q,krit}$ is again increased in a ramp-like manner. At approximately time $t_8$, the load on wheel 7 is reduced to such an extent that the test braking force $F_1$ on the wheel 7 rapidly reduces the rotational speed $v_7$, as can be seen in FIG. 5a. This rapid reduction of the rotational speed $v_7$ causes a brief decrease (54) of the braking force on the wheel 7 shortly after time $t_9$, due to the action of the anti-locking function.

At time $t_9$, the criteria listed in step 33 (FIG. 3) are met, with constant $K_1$ assumed to have an illustrative value of 0.5 (see dashed line 56 in FIG. 5a). Therefore, an imminent danger of overturning is present. Starting at time $t_9$, a braking force $F_2$ (signal 55 in FIG. 5c) is applied to the wheel 4 (on the outside of the curve), as well as to the other wheels 5, 6 on the outside of the curve. Due to this braking force $F_2$, the vehicle 2, 3 decelerates, as can be seen in FIG. 5a from the downward sloping of the rotational speed $v_4$.

Also at time $t_9$, the transverse acceleration threshold $a_{q,krit}$ is set back to the starting value $a_{q,start}$ (step 35 in FIG. 3).

Due to the rapid reduction of the rotational speed $v_7$, the transverse acceleration signal $a_{q,1}$ increases to a maximum value when the rotational speed $v_7$ is reduced to 0. Due to the reduction of the vehicle's traveling speed, and the accompanying reduction of the rotational speed $v_4$, the transverse acceleration signal $a_{q,1}$ also decreases.

At time $t_{10}$, the wheel 7 resumes its rotational movement, thus increasing the rotational speed $v_7$. At time $t_{11}$, the transverse acceleration signal $a_{q,1}$ falls below the transverse acceleration threshold $a_{q,krit}$, which had been set back to the level $a_{q,start}$ at time $t_9$. This results in the immediate termination of the braking intervention. Finally, at time $t_{12}$, the vehicle 2, 3 is again represented as traveling on a straight course.

Illustratively, the following values are preferred for the magnitudes $K_1$, $K_2$, $K_3$, $K_4$, $K_5$, $K_6$, $a_{q,start}$:

$K_1$=0.5
$K_2$=5 m/s$^2$
$K_3$=0.01 m/s$^2$
$K_4$=1 m/s$^2$
$K_5$=5 m/s$^2$
$K_6$=0.01 m/s$^2$ per second
$a_{q,start}$=3 m/s$^2$ While the invention has been described by reference to specific embodiments, this was for purposes of illustration only and should not be construed to limit the scope of the invention. Numerous alternative embodiments will be apparent to those skilled in the art.

What is claimed is:

1. A process to prevent overturning of a vehicle around a longitudinal axis of said vehicle when rounding a curve, in which danger of overturning is evaluated, and braking is automatically applied as required, comprising the following steps:

a) applying a first braking force to at least one first wheel of said vehicle, wherein said at least one first wheel is on the inside of said curve, b) wherein an indication of a potential overturning of said vehicle requires a characteristic reduction of a rotational speed of said at least one first wheel on the inside of said curve, c) applying a second braking force to at least one second wheel of said vehicle, wherein said at least one second wheel is on the outside of said curve, to prevent said vehicle from overturning, d) wherein said first braking force is weaker than said second braking force, e) terminating said first and second braking forces when a rotational speed of said at least one first wheel on the inside of said curve accelerates in a predetermined characteristic manner.

2. The process of claim 1, further comprising the following steps:

f) determining a transverse acceleration level of said vehicle, g) comparing said transverse acceleration level to a predetermined threshold level of said transverse acceleration, h) using the difference between said transverse acceleration level and said predetermined threshold level to indicate a potential overturning of said vehicle.

3. The process of claim 1, wherein said indication of a potential overturning of said vehicle further requires that a characteristic reduction of said rotational speed of said at least one first wheel on the inside of said curve is achieved.

4. The process of claim 3, wherein a verification is made to ascertain whether a rotational speed of said at least one second wheel on the outside of said curve remains essentially unchanged.

5. The process of claim 4, wherein anti-lock braking system slippage signals for said at least one first wheel on the inside of said curve are disabled.

6. The process of claim 5, wherein a predetermined threshold level of a transverse acceleration is varied as a function of the vehicle's reaction to said first braking force.

7. The process of claim 5, wherein a predetermined threshold level of a transverse acceleration is varied as a function of the vehicle's transverse acceleration.

8. The process of claim 5, wherein said first braking force is initiated only when a predetermined threshold level of a transverse acceleration is exceeded.

9. The process of claim 8, wherein a plurality of transverse acceleration signals derived from corresponding wheel rotational speeds are used to improve the validity of a vehicle transverse acceleration determination.

* * * * *